(12) United States Patent
Morita

(10) Patent No.: US 10,910,682 B2
(45) Date of Patent: Feb. 2, 2021

(54) DC POWER CONTROL DEVICE, METHOD OF CONTROLLING DC POWER, AND DC POWER CONTROL SYSTEM

(71) Applicant: Sony Corporation, Tokyo (JP)

(72) Inventor: Tadashi Morita, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/522,488

(22) PCT Filed: Oct. 6, 2015

(86) PCT No.: PCT/JP2015/078284
§ 371 (c)(1),
(2) Date: Apr. 27, 2017

(87) PCT Pub. No.: WO2016/072195
PCT Pub. Date: May 12, 2016

(65) Prior Publication Data
US 2017/0338525 A1    Nov. 23, 2017

(30) Foreign Application Priority Data

Nov. 4, 2014    (JP) ................................ 2014-224107

(51) Int. Cl.
*H02J 7/00*        (2006.01)
*H01M 10/48*    (2006.01)
(Continued)

(52) U.S. Cl.
CPC ........... *H01M 10/48* (2013.01); *H01M 10/44* (2013.01); *H02J 1/00* (2013.01); *H02J 1/02* (2013.01);
(Continued)

(58) Field of Classification Search
CPC .... H01M 10/48; H01M 10/44; H01M 10/482; H01M 10/446; H02J 7/0054; H02J 7/055;
(Continued)

(56) References Cited

U.S. PATENT DOCUMENTS

2013/0007458 A1*  1/2013  Wakita ................... G06Q 30/04
                                                                          713/175
2013/0046495 A1*  2/2013  Sim ..................... G01R 31/3658
                                                                           702/63
(Continued)

FOREIGN PATENT DOCUMENTS

CN            103683374 A       3/2014
EP              3093951 A1     11/2016
(Continued)

OTHER PUBLICATIONS

Written Opinion and English translation thereof dated Dec. 28, 2015 in connection with International Application No. PCT/JP2015/078284.

(Continued)

*Primary Examiner* — Nathaniel R Pelton
*Assistant Examiner* — Michael N Dibenedetto
(74) *Attorney, Agent, or Firm* — Wolf, Greenfield & Sacks, P.C.

(57) ABSTRACT

A DC power control device including: an instructing unit configured to instruct another device connected to a DC bus line to read a voltage value and a current value on the DC bus line; and a correction reference value deciding unit configured to acquire the voltage value and the current value read by the other device and to decide a correction reference value in transmitting and receiving DC power to and from the other device through the DC bus line using the acquired values.

8 Claims, 8 Drawing Sheets

(51) Int. Cl.
*H01M 10/44* (2006.01)
*H02J 3/32* (2006.01)
*H02J 7/34* (2006.01)
*H02J 1/00* (2006.01)
*H02J 7/35* (2006.01)
*H02J 1/10* (2006.01)
*H02J 13/00* (2006.01)
*H02J 1/02* (2006.01)

(52) U.S. Cl.
CPC ....... *H02J 1/10* (2013.01); *H02J 3/32* (2013.01); *H02J 7/34* (2013.01); *H02J 7/35* (2013.01); *H02J 13/0003* (2013.01); *Y02E 40/70* (2013.01); *Y04S 10/123* (2013.01)

(58) Field of Classification Search
CPC .... H02J 7/0063; H02J 7/34; H02J 1/00; H02J 1/02; H02J 1/10; H02J 3/32; H02J 7/0035; H02J 13/0013; Y02E 40/70; Y04S 10/123
USPC ........................................................ 320/108
See application file for complete search history.

(56) References Cited

U.S. PATENT DOCUMENTS

| | | | |
|---|---|---|---|
| 2013/0187660 A1* | 7/2013 | Ishikawa | G01R 31/3658 324/433 |
| 2014/0247014 A1* | 9/2014 | Nishikawa | H01M 10/48 320/126 |
| 2015/0255986 A1 | 9/2015 | Kobayashi | |

FOREIGN PATENT DOCUMENTS

| | | |
|---|---|---|
| EP | 3179588 A1 | 6/2017 |
| JP | 2010-019805 A | 1/2010 |
| JP | 2011-205871 A | 10/2011 |
| JP | 2013-090560 A | 5/2013 |
| JP | 2014-023204 A | 2/2014 |
| JP | 2014-057448 A | 3/2014 |
| WO | WO 2014/010176 A1 | 1/2014 |

OTHER PUBLICATIONS

International Preliminary Report on Patentability and English translation thereof dated May 18, 2017 in connection with International Application No. PCT/JP2015/078284.
Extended European Search Report dated Mar. 8, 2018 in connection with European Application No. 15858058.9.
International Search Report and English translation thereof dated Dec. 28, 2015 in connection with International Application No. PCT/JP2015/078284.
Chinese Office Action and English translation thereof dated Jun. 4, 2019 in connection with Chinese Application No. 201580058338.5.
Japanese Office Action dated Nov. 26, 2019 in connection with Japanese Application No. 2016-557503 and English translation thereof.
Japanese Office Action dated Jun. 23, 2020 in connection with Japanese Application No. 2016-557503 and English translation thereof.
Chinese Office Action dated Jan. 7, 2020 in connection with Chinese Application No. 201580058338.5 and English translation thereof.

* cited by examiner

DC POWER CONTROL DEVICE, METHOD OF CONTROLLING DC POWER, AND DC POWER CONTROL SYSTEM

CROSS-REFERENCE TO RELATED APPLICATIONS

This application is a National Stage of International Application No. PCT/JP2015/078284, filed in the Japanese Patent Office as a Receiving office on Oct. 6, 2015, which claims priority to Japanese Patent Application Number 2014-224107, filed in the Japanese Patent Office on Nov. 4, 2014, each of which is hereby incorporated by reference in its entirety.

TECHNICAL FIELD

The present disclosure relates to a DC power control device, a method of controlling DC power, and a DC power control system.

BACKGROUND ART

An uninterruptible power supply device provided with a storage battery is known. The uninterruptible power supply device is capable of continuously supplying power from the storage battery to equipment connected thereto during a predetermined time without causing power failure even if power from an input power supply is interrupted. Techniques are developed for furnishing each customer with such a power supply device and supplying consumers with power when an abnormality occurs in supplying power due to power failure, shortage in remaining capacity of storage battery, or other reasons (see Patent Literatures 1 and 2).

CITATION LIST

Patent Literature

Patent Literature 1: JP 2011-205871A
Patent Literature 2: JP 2013-090560A

DISCLOSURE OF INVENTION

Technical Problem

When customers supply power to each other, it is desirable, for the sake of efficiency, to supply DC power in consideration of supply of power from a storage battery. In addition, a DC-DC converter that converts voltage is interposed between customers supplying DC power to each other, but an imbalance may occur between customers in supplying DC power depending on an error in measurement by the DC-DC converter.

Therefore, the present disclosure provides a novel and improved DC power control device, method of controlling DC power, and DC power control system, capable of supplying balanced DC power by correcting an error in measurement by the DC-DC converter.

Solution to Problem

According to the present disclosure, there is provided a DC power control device including: an instructing unit configured to instruct another device connected to a DC bus line to read a voltage value and a current value on the DC bus line; and a correction reference value deciding unit configured to acquire the voltage value and the current value read by the other device and to decide a correction reference value in transmitting and receiving DC power to and from the other device through the DC bus line using the acquired values.

In addition, according to the present disclosure, there is provided a method of controlling DC power, the method including: instructing another device connected to a DC bus line to read a voltage value and a current value on the DC bus line; and acquiring the voltage value and the current value read by the other device and deciding a correction reference value in transmitting and receiving DC power to and from the other device through the DC bus line using the acquired values.

In addition, according to the present disclosure, there is provided a DC power control system including: a plurality of battery servers connected to a DC bus line. Each of the battery servers includes an instructing unit configured to instruct another battery server connected to the DC bus line to read a voltage value and a current value on the DC bus line, and a correction reference value deciding unit configured to acquire the voltage value and the current value read by the other battery server and to decide a correction reference value in transmitting and receiving DC power between the battery servers through the DC bus line using the acquired values.

Advantageous Effects of Invention

As described above, the present disclosure provides a novel and improved DC power control device, method of controlling DC power, and DC power control system, capable of supplying balanced DC power by correcting an error in measurement by the DC-DC converter.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
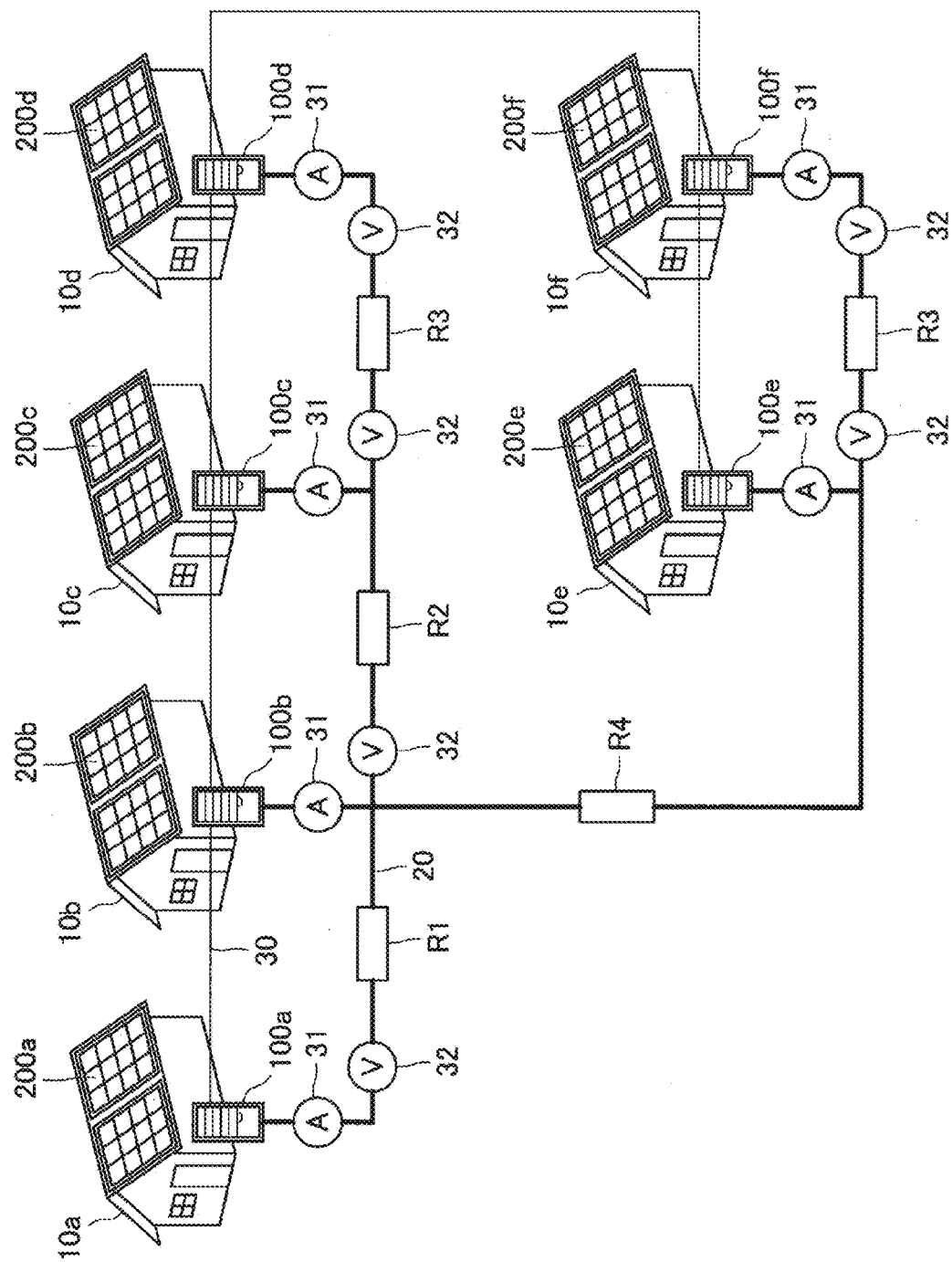
FIG. 1 is a diagram illustrated to describe an exemplary overall configuration of a power transmission and reception control system according to an embodiment of the present disclosure.

Hereinafter, (a) preferred embodiment(s) of the present disclosure is described in detail with reference to the appended drawings. In this specification and the appended drawings, structural elements that have substantially the same function and structure are denoted with the same reference numerals, and repeated explanation of these structural elements is omitted.

The description will be given in the following order.
1. Embodiment of present Disclosure
1.1. Overview
1.2. Exemplary Configuration of System
1.3. Exemplary Operation
2. Summary

1. EMBODIMENT OF PRESENT DISCLOSURE

[1.1. Overview]

An overview of an embodiment of the present disclosure is described and then an embodiment of the present disclosure is described.

A mechanism in which each consumer is provided with a battery server having a storage battery that stores power using power generated by a commercial power supply or a natural energy source such as solar, wind, and geothermal, and the power stored in the storage battery drives electrical appliances is assumed to become increasingly popular in the future. With the spread of such a mechanism, in a case where power in a battery server of a consumer is insufficient as described above, a system allowing a battery server of a consumer having extra power to supply power to the battery server of the consumer having insufficient power is being developed. When consumers supply power to each other, it is preferable, for the sake of efficiency, to supply DC power in consideration of supply of power from a storage battery.

When customers supply DC power to each other, it is preferable to agree previously on the amount of power to be transmitted between a power transmission side and a power reception side. The previously agreed amount of power is necessary to be supplied properly between the power transmission side and the power reception side. This is because the transmission and reception of the proper amount of power between the power transmission side and the power reception side are necessary to exchange power between the power transmission side and the power reception side.

When customers supply DC power to each other, a DC-DC converter that converts a voltage at the customers and a voltage of a DC bus line for connecting between customers is interposed between them. If the DC-DC converter has a function of measuring voltage and current, it is possible to control the operation of the DC-DC converter on the basis of a measurement value of the voltage and the current. However, an imbalance may occur between customers in supplying DC power depending on an error in measurement by the DC-DC converter. If the measurement errors are the same for all the DC-DC converters, they relatively match, and thus it will not cause a problem. However, if the measurement error varies depending on the DC-DC converter, the deviation in actual voltages or currents will occur between customers, and thus some customers get a profit or loss unequally.

In addition, unless a rule for determining whether a measurement value of voltage and current is correct is defined for the whole system, it seems that there is a variation in the transmission power every time DC power is transmitted. If it seems that there is a variation in the transmission power, the user fails to use the DC power reliably.

Thus, in supplying DC power between customers, it is desirable for the user to use the DC power reliably by correcting the measurement error of the DC-DC converter and supplying balanced DC power between the customers.

Therefore, the discloser of this specification has made intensive studies to provide a technology capable of supplying balanced DC power by correcting a measurement error of the DC-DC converter and supplying balanced DC power in supplying DC power between customers. Accordingly, the discloser of the this specification has developed the technology capable of supplying balanced DC power by correcting an error from an accurate voltage value and current value on the basis of the value measured by the DC-DC converter, which will be described later.

An overview of an embodiment of the present disclosure has been described. An exemplary functional configuration of a power transmission and reception control system according to an embodiment of the present disclosure is described.

[1.2. Exemplary Configuration of System]

FIG. 1 is a diagram illustrated to describe an exemplary overall configuration of the power transmission and reception control system according to an embodiment of the present disclosure. FIG. 1 illustrates an exemplary overall configuration of the power transmission and reception control system that interchanges DC power between battery servers having their own storage batteries. An exemplary overall configuration of the power transmission and reception control system according to an embodiment of the present disclosure is described with reference to FIG. 1.

As illustrated in FIG. 1, the power transmission and reception control system 1 is a system constructed to supply DC power as necessary between battery servers provided in each consumer (six in FIG. 1). A consumer 10$a$ is provided with a battery server 100$a$. Similarly, customers 10$b$, 10$c$, and 10$d$ are provided with battery servers 100$b$, 100$c$, and 100$d$, respectively. Furthermore, customers 10$e$ and 10$f$ are provided with battery servers 100$e$ and 100$f$, respectively, and each of the battery servers 100$a$ to 100$f$ has a rechargeable battery provided internally in or externally attached to each battery server.

Furthermore, the battery servers 100$a$ to 100$f$ are connected to a DC bus line 20 through which DC power is mutually supplied between the battery servers as necessary. Each of the battery servers 100$a$ to 100$f$ is provided with a bidirectional DC-DC converter configured to convert voltage of a battery and voltage of the DC bus line 20 from one level to another. Furthermore, the battery servers 100$a$ to 100$f$ are connected to a communication line 30. When DC power is supplied via the DC bus line 20, the battery servers 100$a$ to 100$f$ transmit and receive information via the communication line 30. Although the communication line 30 is illustrated as being wired in FIG. 1, the communication line 30 may be wireless.

The consumers 10$a$ to 10$f$ may be provided with solar panels 200$a$ to 200$f$, respectively. Each of the solar panels 200$a$ to 200$f$ receives irradiation of sunlight and generates power. The solar panels 200$a$ to 200$f$ are configured so that the generated power can be stored in batteries provided in the respective battery servers 100$a$ to 100$f$. Furthermore, power generated by natural energy such as wind and geothermal in addition to sunlight may be stored in the battery servers 100$a$ to 100$f$.

The power transmission and reception control system 1 according to the present embodiment is characterized to provide a mechanism for arbitrating power transmission and reception among the battery servers 100a to 100f so that only one of the battery servers 100a to 100f connected to the DC bus line 20 has a right to control transmission and reception of DC power via the DC bus line 20. In other words, the power transmission and reception control system 1 according to the present embodiment is configured to have a mechanism that allows only a battery server having the control right among the battery servers 100a to 100f to instruct other battery servers to transmit power stored in their own batteries or to receive power for charging their own batteries and prevents a battery server having no control right from performing power transmission and reception without permission.

In this way, only one of the battery servers 100a to 100f connected to the DC bus line 20 has the right to control the transmission and reception of DC power to and from other battery servers via the DC bus line 20. This makes it possible for the power transmission and reception control system 1 according to the present embodiment to avoid an event caused in the case where the roles are simply shared between a master and a slave as described above and to efficiently manage the right to control the transmission and reception of DC power. The power transmission and reception control system 1 according to the present embodiment efficiently manages the right to control the power transmission and reception of DC power, thereby keeping the order of objects to be controlled among the battery servers.

In addition, each of the battery servers 100a to 100f is configured to acquire a current value from an ammeter 31 and to acquire a voltage value from a voltmeter 32. The current and voltage values are measured at the points connected to the DC bus line 20. The ammeter 31 and the voltmeter 32 may be provided in a DC-DC converter described later. The battery servers 100a to 100f exchange information on the current value and the voltage value with each other via the communication line 30. The battery servers 100a to 100f control their respective bidirectional DC-DC converters on the basis of information on the current value and the voltage value acquired via the communication line 30.

An exemplary overall configuration of the power transmission and reception control system according to an embodiment of the present disclosure has been described with reference to FIG. 1. Then, an exemplary functional configuration of the power transmission and reception control system according to an embodiment of the present disclosure is described.

Figure 2:
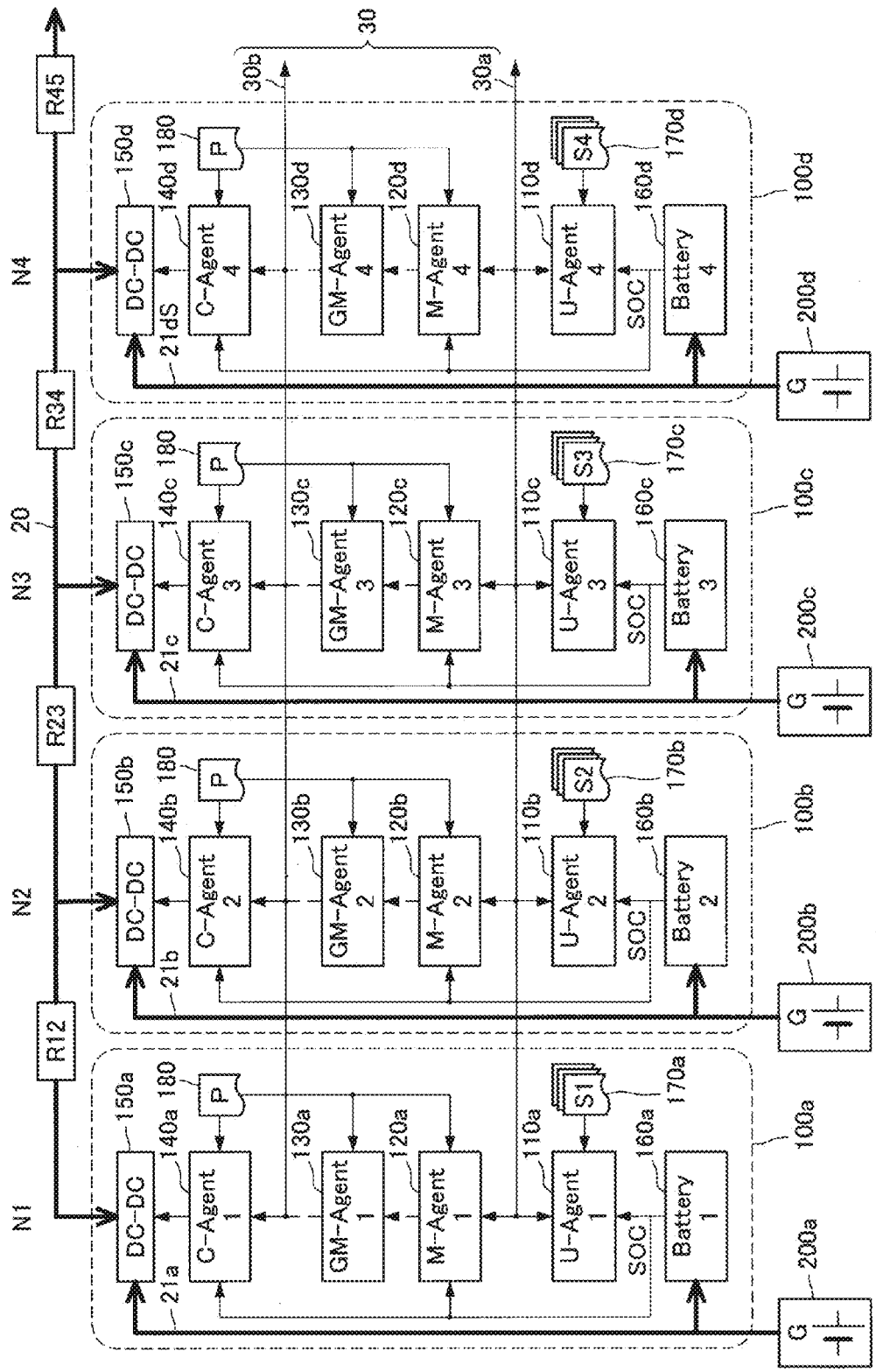
FIG. 2 is a diagram illustrated to describe an exemplary functional configuration of the power transmission and reception control system according to an embodiment of the present disclosure.

FIG. 2 is a diagram illustrated to describe an exemplary functional configuration of the power transmission and reception control system according to an embodiment of the present disclosure. An exemplary functional configuration of the power transmission and reception control system according to an embodiment of the present disclosure is described with reference to FIG. 2.

As illustrated in FIG. 2, the battery server 100a is configured to include a U-Agent 110a, an M-Agent 120a, a GM-Agent 130a, a C-Agent 140a, a DC-DC converter 150a, and a battery 160a. The battery servers 100b, 100c, and 100d have a similar configuration to the battery server 100a. Each of components that constitute the battery server 100a is described.

As illustrated in FIG. 2, the communication line 30 is separated into two paths (channels), that is, a communication line 30a and a communication line 30b. The communication lines 30a and 30b may be physically different wired communication lines, may be physically identical wired or wireless communication lines, or may be separated logically depending on authentication, encryption, or the like. As illustrated in FIG. 2, the communication line 30a allows the U-Agent 110a to communicate with other U-Agents 110b to 110d and allows the M-Agent 120a to communicate with other M-Agents 120b to 120d. The communication line 30b allows the GM-Agent 130a to communicate with other GM-Agents 130b to 130d, and the C-Agent 140a to communicate with other C-Agents 140b to 140d.

The power transmission and reception control system 1 according to the present embodiment uses separate communication lines for the U-Agent 110a and the M-Agent 120a and for the GM-Agent 130a and the C-Agent 140a as described above. Thus, this separate communication lines allows the U-Agent 110a and the M-Agent 120a to be prevented from delivering an instruction directly to the GM-Agent 130a and the C-Agent 140a. Moreover, this separate communication lines allows the GM-Agent 130a and the C-Agent 140a to be prevented from delivering an instruction directly to the U-Agent 110a and the M-Agent 120a.

The U-Agent 110a periodically checks the state of charge (SOC) in the battery 160a. In a case where the state of charge in the battery 160a satisfies a predetermined condition, the U-Agent 110a requests the M-Agent 120a to receive power. Contents of the request to be delivered from the U-Agent 110a to the M-Agent 120a may include a voltage value or current value in receiving power, a time to receive power (e.g., start time, end time, and duration), and a state of charge in the battery 160a that stops receiving power.

The U-Agent 110a refers to a scenario 170a in determining whether the state of charge in the battery 160 satisfies a predetermined condition. In the scenario 170a, a condition of the state of charge in the battery 160a, which is used for the U-Agent 110a to request the M-Agent 120a to receive power, is described. The condition described in the scenario 170a may include contents of the U-Agent 110a requesting the M-Agent 120a to receive power when the state of charge in the battery 160a is lower than or equal to 20%.

The U-Agent 110a may have a function of editing contents of the scenario 170a on the basis of a request from the user. The contents of the scenario 170a may be described in text, a markup language such as extensible markup language (XML), or a scripting language such as Lisp, Perl, and PHP. In the case where the contents of the scenario 170a are described in a scripting language, the contents of the scenario 170a may be described in a set of functions.

Furthermore, the scenario 170a may be edited using a text editor, a dedicated editor, or a web browser. The U-Agent 110a may be configured to operate a tool capable of editing contents of the scenario 170a.

Furthermore, in the case where there is a request for supply of power from another battery server, a way of determining whether power transmission is permitted in response to the request depending on what condition is satisfied may be described in the scenario 170a. In one example, in the case where there is a request for supply of power from another battery server, contents in which power transmission is permitted in response to the request under the condition that the state of charge in the battery 160a is higher than or equal to 80% may be described as the condition of the scenario 170a. In one example, in the case where there is a request for supply of power from another battery server, contents in which power transmission is permitted in response to the request under the condition that the state of charge in the battery 160a is higher than or equal to 80% and the usage rate per hour of the power is lower than or equal to 10% may be described as the condition of the scenario 170a. In other words, the condition described in the scenario 170a may include not only the state of charge in the battery 160a but also the state of use of power stored in the battery 160a.

The contents of the scenario can be defined independently for the respective battery servers. Accordingly, the condition in which the power reception described above is requested or the condition in which power transmission is permitted in response to a request in the case where there is the request for supply of power from another battery server may be different for each of the battery servers. In addition, the number of scenarios to be defined in each battery server is not limited to only one. The scenario referred to by the U-Agent 110a may be switched into another depending on the status.

In the case where the M-Agent 120a receives a request for power reception from the U-Agent 110a, the M-Agent 120a inquires of the M-Agents 120b, 120c, and 120d of the other battery servers about whether they are allowed to transmit power by performing communication with the M-Agents 120b, 120c, and 120d via the communication line 30a. In addition, in the case where the M-Agent 120a receives an inquiry about whether the M-Agent 120a is allowed to transmit power from the M-Agents 120b, 120c, and 120d of the other battery servers, the M-Agent 120a replies a response about whether power is allowed to be transmitted or not.

Furthermore, in the case where the M-Agent 120a receives an inquiry about whether the M-Agent 120a is allowed to transmit power from the M-Agents 120b, 120c, and 120d of the other battery servers, the M-Agent 120a may respond that power is allowed to be transmitted. In this case, if the GM-Agent 130a is not started, the M-Agent 120a inquires of the M-Agents 120b, 120c, and 120d of the other battery servers about whether the GM-Agents 130b, 130c, and 130d are being started via the communication line 30a. Although details will be described later, the GM-Agent 130a is started on the basis of a start instruction from the M-Agent 120a and controls the DC-DC converters 150a to 150d of the battery servers to operate.

In the power transmission and reception control system 1 according to the present embodiment, only one of the GM-Agents 130a to 130d is permitted to start. Thus, if the GM-Agent 130a is not started, the M-Agent 120a determines that the battery server 100a does not have a right to control the power transmission and reception and inquires of the M-Agents 120b, 120c, and 120d of the other battery servers about whether they have the right to control the power transmission and reception, that is, whether the GM-Agents 130b, 130c, and 130d are started or not, via the communication line 30a. If there is a GM-Agent being started, the M-Agent 120a requests the GM-Agent being started to transmit and receive power through the M-Agent by which the GM-Agent is started. In one example, if the GM-Agent 130b is being started, the M-Agent 120a requests the M-Agent 130b to transmit and receive power through the M-Agent 120b.

On the other hand, if there is an inquiry about whether power transmission is allowed from the M-Agents 120b, 120c, and 120d of the other battery servers, it may be responded that the power transmission is allowed. In this case, if the GM-Agent 130a is being started, the response is replied together with information indicating that the GM-Agent 130a is being started.

The M-Agent 120a notifies the C-Agent 140a to follow an instruction only from a GM-Agent of a battery server having the control right. In one example, the M-Agent 120a notifies identification information used to identify a GM-Agent of a battery server having the control right to the C-Agent 140a. The reception of the notification of identification information used to identify a GM-Agent of a battery server having the control right by the C-Agent 140a makes it possible for the C-Agent 140a to ignore an instruction from a GM-Agent that contains identification information other than the identification information.

The GM-Agent 130a is started and is activated in accordance with a start instruction from the M-Agent 120a. The GM-Agent 130a is stopped and is deactivated in accordance with a stop instruction from the M-Agent 120a. The activated GM-Agent 130a controls the power transmission and reception by the DC-DC converters 150a to 150d through the C-Agents 140a to 140d via the communication line 30b on the basis of the request for the power transmission and reception from the M-Agents 120a to 120d. Then, when the requested power transmission and reception is completed, the GM-Agent 130a performs processing for releasing the control right. If the control right is released, the GM-Agent 130a is stopped and deactivated in accordance with the stop instruction from the M-Agent 120a.

When the GM-Agent 130a receives a request for the power transmission and reception from the M-Agents 120a to 120d, the GM-Agent 130a acquires the power transmission and reception capacities of the respective battery servers 100a to 100d from the C-Agents 140a to 140d via the communication line 30b. In addition, the GM-Agent 130a calculates an amount of current in which power can be transmitted, from a total transmission current amount of the DC bus line 20. If an accumulated power transmission amount reaches a desired power transmission amount after the start of power transmission, the GM-Agent 130a instructs the C-Agents 140a to 140d to stop transmitting power via the communication line 30b.

The C-Agent 140a controls the DC-DC converter 150a on the basis of an instruction from the activated (i.e. having a control right) GM-Agent among the GM-Agents 130a to 130d. The C-Agent 140a receives the notification from the M-Agent 120a to follow only the instruction from a GM-Agent of a battery server having the control right. Thus, the C-Agent 140a controls the DC-DC converter 150a in accordance with only the instruction from a GM-Agent of a battery server having the control right.

The C-Agent 140a periodically checks a parameter of the DC-DC converter 150a. When an abnormality occurs in the parameter of the DC-DC converter 150a, a warning is notified to a target transmitter or receiver of power.

The DC-DC converter 150a is connected to the battery 160a or the solar panel 200a via a local bus line 21a, and is connected to the DC-DC converters 150b to 150d of the other battery servers 100b to 100d via the DC bus line 20. The DC-DC converter 150a performs conversion of DC power between the DC bus line 20 and the local bus line 21a under the control by the C-Agent 140a.

In the present embodiment, the DC-DC converter 150a has four modes. These four modes are a constant voltage control mode in which voltage of the DC bus line 20 is maintained at a specified voltage, a constant current charging mode in which current is drawn from the DC bus line 20, a constant current discharging mode in which current flows into the DC bus line 20, and a standby mode that is neither of these three modes.

The U-Agent 110a operates in accordance with the scenario 170a defined independently in the respective battery servers 100a to 100d. The M-Agent 120a, the GM-Agent 130a, and the C-Agent 140a operate in accordance with a common policy 180 in all of the battery servers 100a to 100d. Thus, the M-Agent 120a, the GM-Agent 130a, and the C-Agent 140a are not permitted to operate in accordance with a rule that differs from the other battery servers 100b to 100d.

The contents of the policy 180 may be described in text, a markup language such as extensible markup language (XML), or a scripting language such as Lisp, Perl, and PHP. In the case where the contents of the policy 180 are described in a scripting language, the contents of the policy 180 may be described in a set of functions.

Furthermore, the policy 180 may be edited using a text editor, a dedicated editor, or a web browser. As described above, the policy 180 is commonly referred to by all the battery servers 100a to 100d, and thus the user is desirably unable to edit easily, but it may be possible that the user can edit as necessary. The M-Agent 120a, the GM-Agent 130a, or the C-Agent 140a may edit the policy 180 on the basis of the rule defined in the policy 180.

Examples of the contents described in the scenario 170a may include as follows:

State of charge (SOC) level at which supply of power is requested

SOC level at which power is determined to be supplied

Technique for predicting and calculating battery residual amount with daily power consumption cycle Technique for predicting and calculating weekly power generation amount depending on acquisition of weather information Calculation of reduction in AC power usage depending on power interchange Examples of the contents described in the policy 180 may include a document version, date of modification, a rule in modifying described contents, and respective rules defined for the M-Agents 120a to 120d, the GM-Agents 130a to 130d, and the C-Agents 140a to 140d.

Examples of rules defined for the M-Agents 120a to 120d may include as follows:

Determination condition and decision procedure for acquiring control right

Decision procedure to appeal from other devices

Procedure of checking survival of battery server joined in the power transmission and reception control system 1

Procedure of deleting registration of battery server previously joined in the power transmission and reception control system 1

List and authentication information of members joined in the power transmission and reception control system 1

Examples of the determination condition for acquiring a control right may include a condition in which a control right can be acquired if there is even one M-Agent being in favor and a condition in which a control right can be acquired if a majority is in favor. Examples of the decision procedure for acquiring a control right may include a decision procedure in which a command is broadcast to another M-Agent to acquire a control right and whether the control right is acquired is determined on the basis of a response from the other M-Agent that returned an answer in a predetermined time. Similarly, examples of the decision procedure to appeal from other devices may include a decision procedure in which a command is transmitted to another M-Agent to acquire a control right and whether the control right is acquired is determined on the basis of the contents of appeal from the other M-Agent that returned an answer in a predetermined time.

Examples of the procedure of checking survival of a battery server joined in the power transmission and reception control system 1 may include an example in which an M-Agent of the last battery server acquired the control right checks whether other battery servers are survived.

Examples of the procedure of deleting registration of a battery server previously joined in the power transmission and reception control system 1 may include a procedure of deleting registration information described in the policy 180 on the basis of a command for requesting the deletion.

The list and authentication information of members joined in the power transmission and reception control system 1 are described in the policy 180, and thus the M-Agent can transmit various commands only to the joined member and can add authentication information thereto in transmitting the commands. Examples of the authentication information of a member may include address information of each battery server and an authentication key that is common to the battery servers.

Examples of a rule defined for the GM-Agents 130a to 130d may include as follows:

Information on state of connection of battery servers as viewed from their respective positions Technique of calculating current capacity on the basis of information on state of connection of each battery server Control procedure and limitations of DC-DC converter Procedure from start to end for power transmission and reception in each battery server Abandonment or transfer procedure of control right after supply of power is stopped Processing procedure in case where abnormality is notified The DC power flows in the DC bus line 20, and thus the GM-Agents 130a to 130d are necessary to know a state of connection of the battery servers 100a to 100d to the DC bus line 20 and to decide how to supply power on the basis of position information of the battery servers 100a to 100d. The state of connection of the battery servers 100a to 100d to the DC bus line 20 is described in the policy 180, and thus the GM-Agents 130a to 130d refer to the state of connection and control the DC-DC converters 150a to 150d.

Examples of the procedure of controlling a DC-DC converter may include contents of an instruction to be delivered to the DC-DC converter in converting DC power. Examples of the limitations of a DC-DC converter may include a range in which power can be converted.

Examples of the procedure from start to end for power transmission and reception in each battery server may include a procedure of increasing current at the start of the power transmission or reception and a procedure of decreasing current at the end of the power transmission or reception.

Examples of the abandonment or transfer procedure of a control right after supply of power is stopped may include a procedure in which, for example, if there is another battery server that supplies power, the control right is transferred to the other battery server.

Examples of the processing procedure in a case where abnormality is notified may include a procedure in which, if a battery server has a failure, the failed battery server is ignored, and the processing proceeds.

Examples of a rule defined for the C-Agents 140a to 140d may include as follows:

Procedure of checking whether the control is continued by a GM-Agent of a battery server having a control right and processing procedure upon occurrence of abnormality Procedure of checking whether it is controlled simultaneously by a plurality of GM-Agents Processing procedure in case where it is controlled simultaneously by a plurality of GM-Agents Monitoring procedure of checking operations of a DC-DC converter and appropriately notifying the result to a GM-Agent of a battery server having the control right Examples of the procedure of checking whether the control is continued by a GM-Agent of a battery server having the control right may include a procedure of checking whether the control is performed by a GM-Agent every predetermined time intervals. Examples of the processing procedure upon occurrence of abnormality may include a procedure of notifying a GM-Agent of a battery server a control right that the control by the GM-Agent is interrupted for more than a predetermined time.

Examples of the procedure of checking whether it is controlled simultaneously by a plurality of GM-Agents may include a procedure of checking whether the control is performed by a GM-Agent having identification information that differs from identification information notified from the M-Agent. Examples of the processing procedure in the case where it is controlled simultaneously by a plurality of GM-Agents may include a procedure of ignoring the control by a GM-Agent having identification information that differs from identification information notified from an M-Agent and notifying a GM-Agent of a battery server having a control right that it is controlled simultaneously by the plurality of GM-Agents by dealing with the control from all of the GM-Agents as an error.

Examples of the monitoring procedure of checking operations of a DC-DC converter and appropriately notifying the result to a GM-Agent of a battery server having a control right may include a procedure of checking a parameter of a DC-DC converter every predetermined time intervals and notifying a parameter of the DC-DC convert to a GM-Agent of a battery server having a control right.

The policy 180 defined as described above allows the C-Agents 140a to 140d to deliver an instruction to stop transmitting power to the DC-DC converters 150a to 150d immediately when the instruction from the GM-Agent violates the contents of the policy 180.

It should be appreciated that the description contents of the scenario 170a or the policy 180 and examples of the description contents of the scenario 170a or the policy 180 are not limited to those described above. The description contents of the scenario 170a or the policy 180 may be changed appropriately depending on the configuration of the power transmission and reception control system 1 or the configuration of each of the battery servers 100a to 100d.

The battery 160a is composed of a rechargeable secondary battery. The battery 160a may be charged depending on power generated by the solar panel 200a or power supplied from the commercial supply of power (not shown). In addition, the battery 160a may be charged with power supplied from other battery servers 100b to 100d as necessary. In addition, the power stored in the battery 160a may be supplied to electric appliances such as air conditioner, refrigerator, washing machine, television set, and microwave, provided in the consumer 10a. Moreover, the power stored in the battery 160a may be supplied from the DC-DC converter 150a to other battery servers 100b to 100d depending on the request from the other battery servers 100b to 100d.

The battery servers 100a to 100d according to an embodiment of the present disclosure have the configuration as illustrated in FIG. 2, and thus only one battery server of them having a control right can control power transmission and reception of DC power to and from the other battery servers via the DC bus line 20. The battery servers 100a to 100d according to an embodiment of the present disclosure having the configuration as illustrated in FIG. 2 make it possible to avoid an event that may occur in the case where the roles are simply shared between a master and a slave as described above and to manage efficiently the right to control the power transmission and reception of DC power. The battery servers 100a to 100d according to an embodiment of the present disclosure have the configuration as illustrated in FIG. 2, and thus it is possible to manage efficiently the right to control the power transmission and reception of DC power, thereby keeping the order of objects to be controlled among the battery servers.

Moreover, the DC bus line 20 or the local bus lines 21a to 21d are not limited to the particular configuration. In one example, the DC bus line 20 or the local bus lines 21a to 21d may be configured as a DC single-phase three-line bus line having two lines supplied with positive voltage and negative voltage and one line connected to the ground.

In the power transmission and reception control system 1 including the plurality of battery servers having the configuration as described above, in transmitting and receiving DC power among the battery servers, an error may occur between the voltage and current values read by the DC-DC converter of each of the battery servers and accurate voltage and current values. In this case, a difference occurs in recognition of the amount of power between the power transmission side and the power reception side. In one example, in the case where the power of 2 A at 350 V is supplied, if a value of 0.1 A less than an accurate current value is read on the power reception side, the value of 0.1 A is necessary to be handled by a power supply side or a battery server serving as a master.

Thus, the battery server according to the present embodiment executes processing for allowing each of the battery servers to correct an error from accurate voltage and current values on the basis of the value measured by the DC-DC converter of each of the battery servers. The processing for allowing each of the battery servers to correct an error from accurate voltage and current values makes it possible for the battery server according to the present embodiment to perform balanced transmission and reception of DC power among the battery servers.

Figure 3:
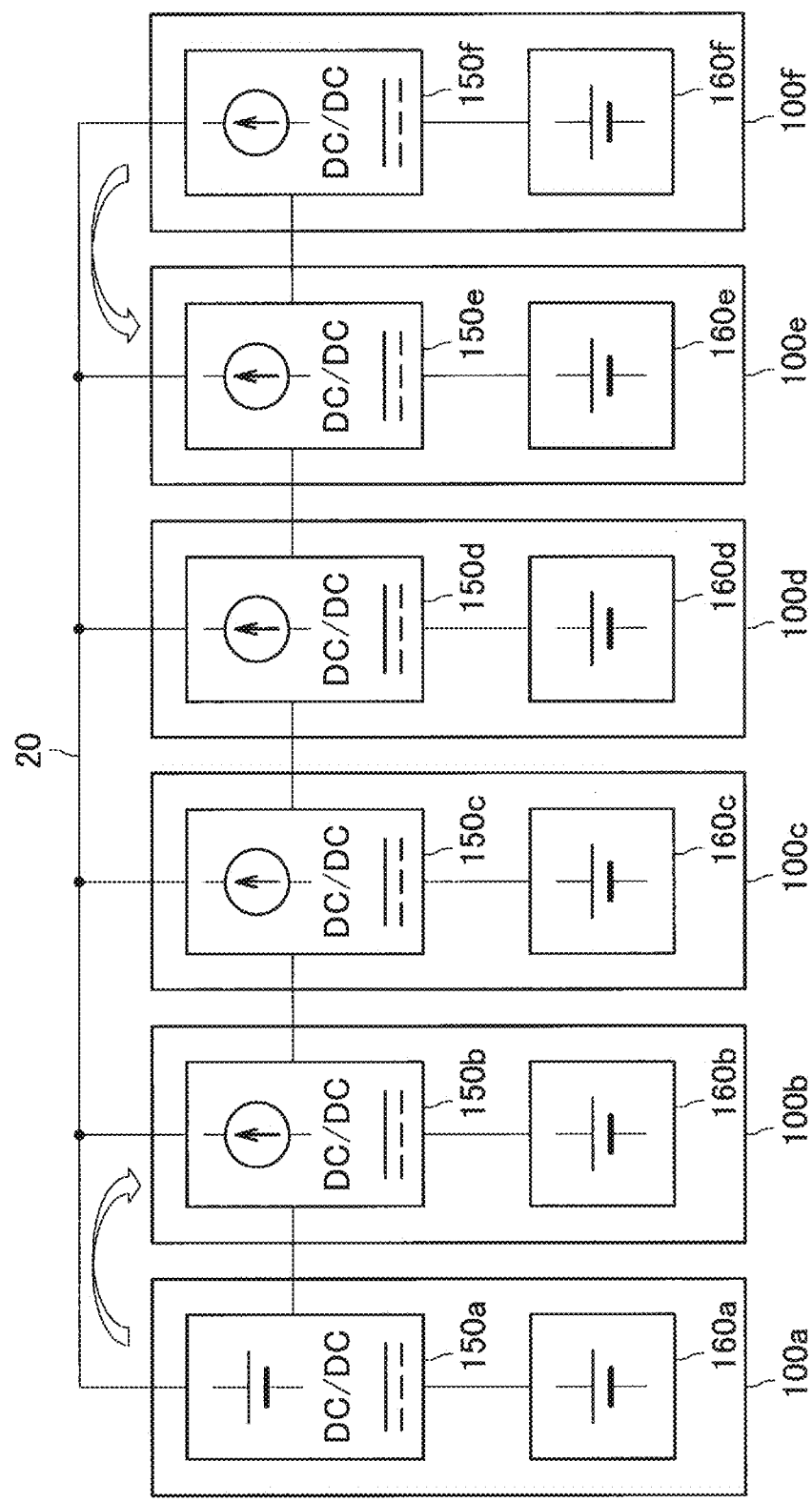
FIG. 3 is a schematic diagram illustrated to describe the configuration of the power transmission and reception control system 1 shown in FIG. 2.

FIG. 3 is a schematic diagram illustrated to describe the configuration of the power transmission and reception control system 1 shown in FIG. 2. FIG. 3 illustrates an example of the case where the DC-DC converter 150a of the battery server 100a is set to a constant voltage control mode and the DC-DC converters 150b to 150f of the other battery servers 100b to 100f are set to a constant current charging mode or a constant current discharging mode.

In the case where DC power is transmitted from one battery server to another battery server, the operation mode of the DC-DC converter of the one battery server is set to the constant voltage control mode and thus the voltage of the DC bus line 20 is fixed. Then, the operation mode of the DC-DC converter of each of the other battery servers is set to the constant current charging mode or the constant current discharging mode at a constant current value, and thus the power transmission and reception is performed among the battery servers.

The voltmeter and ammeter provided in the DC-DC converter of each of the battery servers do not necessarily read an accurate value at all times. A predetermined reading error occurs in manufacturing the DC-DC converter, and there may be a case where the read value changes due to aged deterioration or the like. If an error occurs in the value read by the DC-DC converter, then the battery server that operates the DC-DC converter in the constant voltage control mode absorbs the error. Thus, each of the battery servers fails to interchange the proper power, and a power shortage in interchanging becomes a burden to only the battery server operating the DC-DC converter in the constant voltage control mode.

Thus, it is necessary to correct a value read by each DC-DC converter to supply DC power among the battery servers. The correction of a value read by each DC-DC converter to supply DC power among the battery servers allows the balanced power transmission and reception to be performed among the battery servers.

In the present embodiment, a technique for correcting the error of the value read by the DC-DC converter has two types, that is, an on-demand error correction technique and an in-advance error correction technique. The on-demand error correction technique performs correction as necessary in performing power transmission and reception, and the in-advance error correction technique performs correction in advance using the value read by the DC-DC converter.

The on-demand error correction technique is now described. The on-demand error correction technique decides previously which one of the power transmission and reception sides that is to set to a correct value.

In the on-demand error correction technique, in the case where a value read by a battery server on the power reception side is set to be positive, a battery server that supplies power increases or decreases discharge current by balancing the current value of a battery server operating in the constant voltage control mode rather than a value read by oneself to be set to 0 A. In the case where the battery server that supplies power is operating in the constant voltage control mode, such correction is not necessary.

The transmission power in the case where a value read by the battery server on the power reception side is set to be positive becomes a value obtained by multiplying voltage and current values read by the battery server on the power reception side by the time. In the case where a value read by the battery server on the power reception side is set to be positive, even if power transmission loss occurs, the battery server on the power transmission side is responsible for the power transmission loss.

On the other hand, in the case where a value read by the battery server on the power transmission side is set to be positive, the reception current of the battery server on the power reception side is adjusted and the current value of the battery server operating in the constant voltage control mode is balanced to be set to 0 A.

The transmission power in the case where a value read by the battery server on the power transmission side is set to be positive becomes a value obtained by multiplying voltage and current values read by the battery server on the power transmission side by the time. In the case where a value read by the battery server on the power transmission side is set to be positive, even if power transmission loss occurs, the battery server on the power reception side is responsible for the power transmission loss.

In one example, as shown in FIG. 3, it is considered a case where the battery servers 100a to 100f are connected to the DC bus line 20, the voltage of the DC bus line 20 is set to 350 V, and the current of 2 A flows. In this case, information indicating that the voltage of the battery server 100b is read to be lower by 1 V than that of the battery server 100a and the current thereof is read to be lower by 0.1 A is previously held in the battery servers 100a and 100b. In one example, this information may indicate that the GM-Agent instructs each of the battery servers to read a value, collect the read values, obtain a difference, and transmit it to each battery server.

Then, the case where the battery server 100a transmits DC power of 350 V at a current of 2 A to the battery server 100b is considered. In this case, if the resistance value of the DC bus line 20 between the battery server 100a and the battery server 100b is set to 0.5Ω, the voltage will drop by 1 V when power is transmitted from the battery server 100a to the battery server 100b. However, the voltage of the battery server 100b is read to be lower by 1 V than that of the battery server 100a, and thus the voltage value read by the battery server 100b is 348 V. In addition, in the case where the battery server 100b draws the current of 2 A from the DC bus line 20, it is read that the current of 2.1 A flows in the battery server 100a.

Thus, the battery server 100a recognizes that DC power of 2.1 A is being supplied to the battery server 100b at 349 V, and the battery server 100b recognizes that DC power of 2 A is being supplied to the battery server 100a at 348 V. Accordingly, it is recognized that the battery server 100a supplies the DC power of 733 W and the battery server 100b receives the power of 696 W. Which of these values is to be positive is decided beforehand between the battery servers.

Another pattern of the correction by the on-demand error correction technique is described. It is considered the case where the battery server 100a sets the voltage of the DC bus line 20 to 350 V and the battery server 100f supplies power to the battery server 100e. In this case, information indicating that the voltage of the battery server 100b is read to be higher by 1 V than that of the battery server 100f and the current thereof is read to be higher by 0.1 A is previously held in the battery servers 100e and 100f.

Then, in the case where the battery server 100f transmits DC power of the voltage of 350 V at the current of 2 A to the battery server 100e, the battery server 100a sets the discharge current into the battery server 100f to 2 A, and sets the charge current of the battery server 100e to 2 A.

However, the current of the battery server 100e is read to be higher by 0.1 A than that of the battery server 100f, and thus the battery server 100e is lower by 0.1 A than that of the battery server 100f. Thus, the battery server 100a sets the discharge current into the battery server 100f to 1.9 A to achieve the balance.

Thus, it is recognized that the battery server 100f supplies DC power of 669 W and the battery server 100e receives power of 700 W. Which of these values is to be positive is decided beforehand between the battery servers.

The on-demand error correction technique has been described. Thus, the GM-Agent can function as an instructing unit and a correction reference value deciding unit of the present disclosure.

Next, the in-advance error correction technique is described.

The in-advance error correction technique is an approach in which a reading error in voltage and current values between one battery server and other battery servers is previously held in each of the battery servers, and the discharge current and the power reception current to each battery server to cancel an error between battery servers are set. More specifically, the in-advance error correction technique is an approach, in one example, for obtaining an error in each of the battery servers using the method of least squares and for deciding a reference value by averaging the errors, as described later.

One battery server (e.g., a battery server having a control right to control the DC bus line 20, that is, a battery server where a GM-Agent is activated) collects reading values of voltage and current from other battery servers, and creates an error correction formula to be described later from the reading error. Then, the battery server having the control right sets the discharge current and the reception current for each of the battery servers so that an error between the battery servers is cancelled. The current corresponding to the error does not flow through the battery server operating in the constant voltage control mode. However, if the current more than a specified value flows, an error between battery servers relating to the power transmission and reception is re-calculated and the correction value is modified.

A voltage correction formula using the in-advance error correction technique is calculated, for example, as follows. The battery server having the control right operates the DC-DC converter of one battery server in the constant voltage control mode and sets the DC bus line 20 to a specified voltage. Then, a voltage value read by the DC-DC converter of each of other battery servers are collected via the communication line 30.

The battery server having the control right changes the voltage of the DC bus line 20 within a specified operation range for the battery server that causes the DC-DC converter to be operated in the constant voltage control mode. With this change, the battery server repeatedly sets the voltage of the DC bus line 20 and collects voltage values read by the DC-DC converter of each of other battery servers.

Then, the battery server having the control right calculates a voltage correction formula based on each of the battery servers, for example, by the method of least squares using the collected voltage values, and transmits it to each of the battery servers to store the voltage correction formula.

A current correction formula using the in-advance error correction technique is calculated, for example, as follows. The battery server having the control right operates the DC-DC converter of one battery server in the constant voltage control mode and sets the DC bus line 20 to a specified voltage. Then, the operation mode of the DC-DC converter of one battery server among the other battery servers is set to the constant current charging mode or the constant current discharging mode by the current limitation, and the current value is set for the DC-DC converter. In this case, the DC-DC converter collects current values read by the battery server operating in the constant voltage control mode.

The battery server having the control right changes the voltage of the DC bus line 20 within a specified operation range for the battery server that causes the DC-DC converter to be operated in the constant voltage control mode. In addition, the battery server having the control right changes the current value within a specified operation range for the battery server in which the operation mode of the DC-DC converter is set to the constant current charging mode or the constant current discharging mode. Then, the battery server having the control right repeats the setting of the voltage of the DC bus line 20 and the collection of the current value.

Moreover, the battery server having the control right sets a plurality of current values for the battery server that is set in the constant current charging mode or the constant current discharging mode as described above, but the total of the final current values in the battery server may be adjusted to be 0 A. This adjustment by the battery server having the control right so that the total of the final current values is 0 A makes it possible to collect the current values without a transfer of power.

Then, the battery server having the control right calculates a current correction formula based on each of the battery servers, for example, by the method of least squares using the collected current value, and transmits it to each of the battery servers to store the current correction formula. The voltage correction formula is, for example, a correction formula that is decided by obtaining an error in each of the battery servers using the method of least squares and by averaging the error as described later.

The in-advance error correction technique is described in detail with reference to the drawings. The following description is given on the assumption that a battery server having the control right to control the DC bus line 20 (i.e., a battery server in which the GM-Agent is activated) calculates a formula for correction. It should be appreciated that the battery server that calculates the formula for correction is not limited to the battery server having the control right to control the DC bus line 20.

Figure 4:
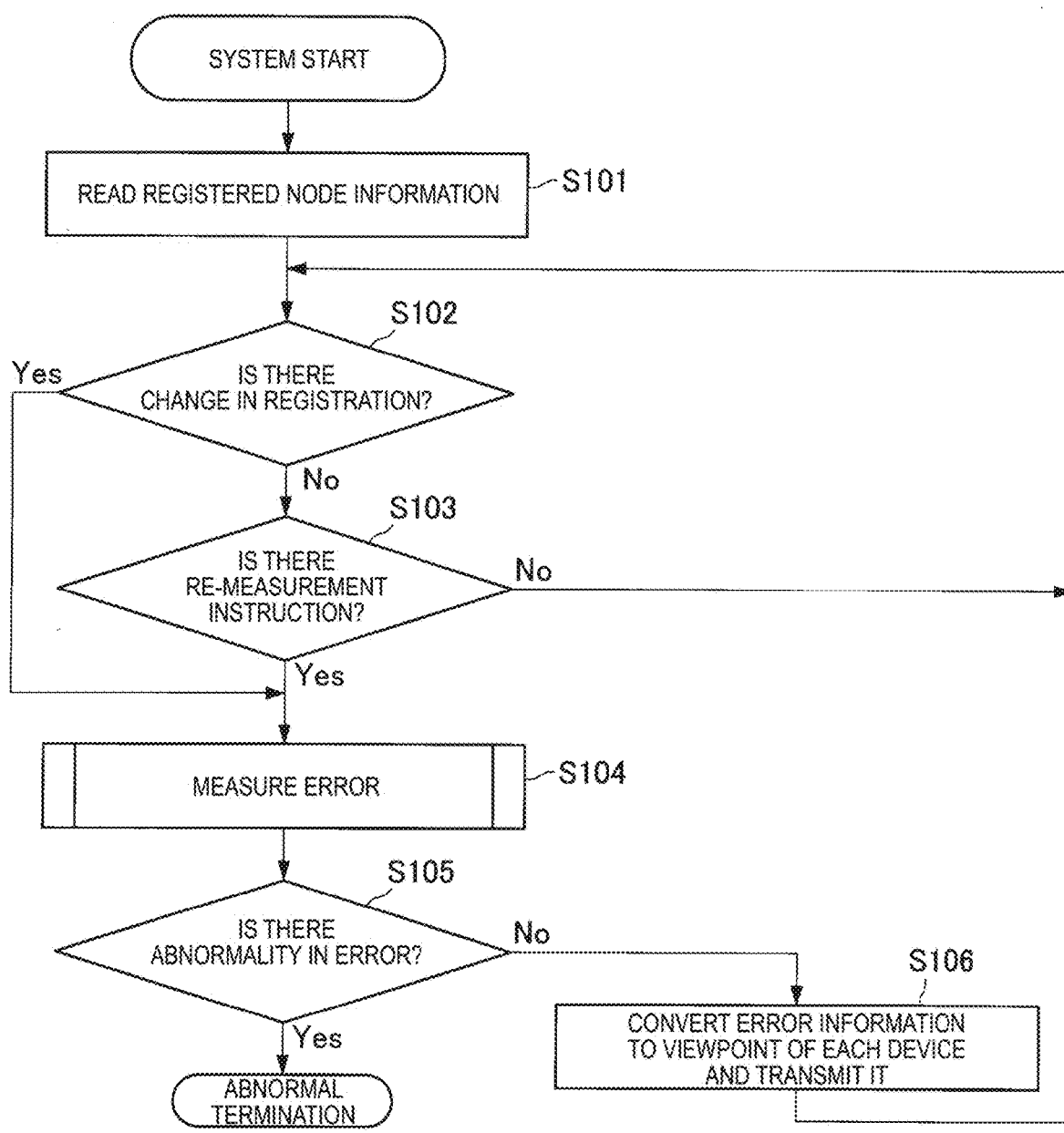
FIG. 4 is an exemplary operation of a battery server according to an embodiment of the present disclosure.

FIG. 4 is an exemplary operation of the battery server according to an embodiment of the present disclosure. FIG. 4 illustrates an exemplary operation of the battery server according to an embodiment of the present disclosure in measuring a reading error between battery servers beforehand by the in-advance error correction technique.

The GM-Agent of the battery server, which is started and obtains a control right by arbitration between the battery server and other battery servers, reads registered node information (step S101). The GM-Agent, when reading the registered node information, determines whether there is a change in registration, that is, whether there is a battery server that newly joins the DC grid or whether there is a battery server that has left the DC grid (Step S102).

If it is determined in step S102 that there is no change in registration, then the GM-Agent determines whether there is a re-measurement instruction, more specifically, an instruction to re-measure the error that is read between the battery servers (step S103). This re-measurement instruction may be generated periodically by trigger using a timer or may be instructed manually by the user.

If it is determined in step S103 that the re-measurement instruction is not generated (No in step S103), the GM-Agent returns to the determination processing of step S102.

On the other hand, if it is determined in step S102 that there is a change in registration (Yes in step S102) or if it is determined in step S103 that the re-measurement instruction is generated (Yes in step S103), then the GM-Agent measures a reading error between the battery servers (step S104). The measurement of the reading error between the battery servers by the GM-Agent allows an error correction formula to be described later to be created. The measurement of the reading error between battery servers will be described later in a description with reference to FIG. 6.

The GM-Agent, when measuring the reading error between the battery servers, determines whether an abnormality occurs in the reading error between the battery servers (step S105). The determination of whether an abnormality occurs in the reading error between the battery servers may be based on, for example, whether an error equal to or larger than a predetermined value occurs or whether there is a difference in values which is apparently thought to have some trouble occurring as compared with the previous measurement value.

If it is determined in step S105 that no abnormality occurs in the reading error between the battery servers (No in step S105), then the GM-Agent converts the created error correction formula to a viewpoint from each node (battery server) and transmits it to each node (step S106). The conversion from each node (battery server) to the viewpoint will be described later.

On the other hand, if it is determined in step S105 that an abnormality occurs in the reading error between the battery servers (Yes in step S105), the GM-Agent does not perform the conversion and transmission of the error correction formula and abnormal termination occurs. If an abnormality occurs in the reading error between battery servers, the GM-Agent may execute processing to generate some types of alert about the occurrence of an abnormality. This alert may be an appeal to the auditory sense by sound and the like or may be an appeal to the vision, but the technique and contents thereof are not limited to particular ones.

The overall procedure of the operation of the battery server has been described with reference to FIG. 4. Next, the measurement of the reading error between the battery servers shown in step S104 of FIG. 4 is described in detail.

Figure 5:
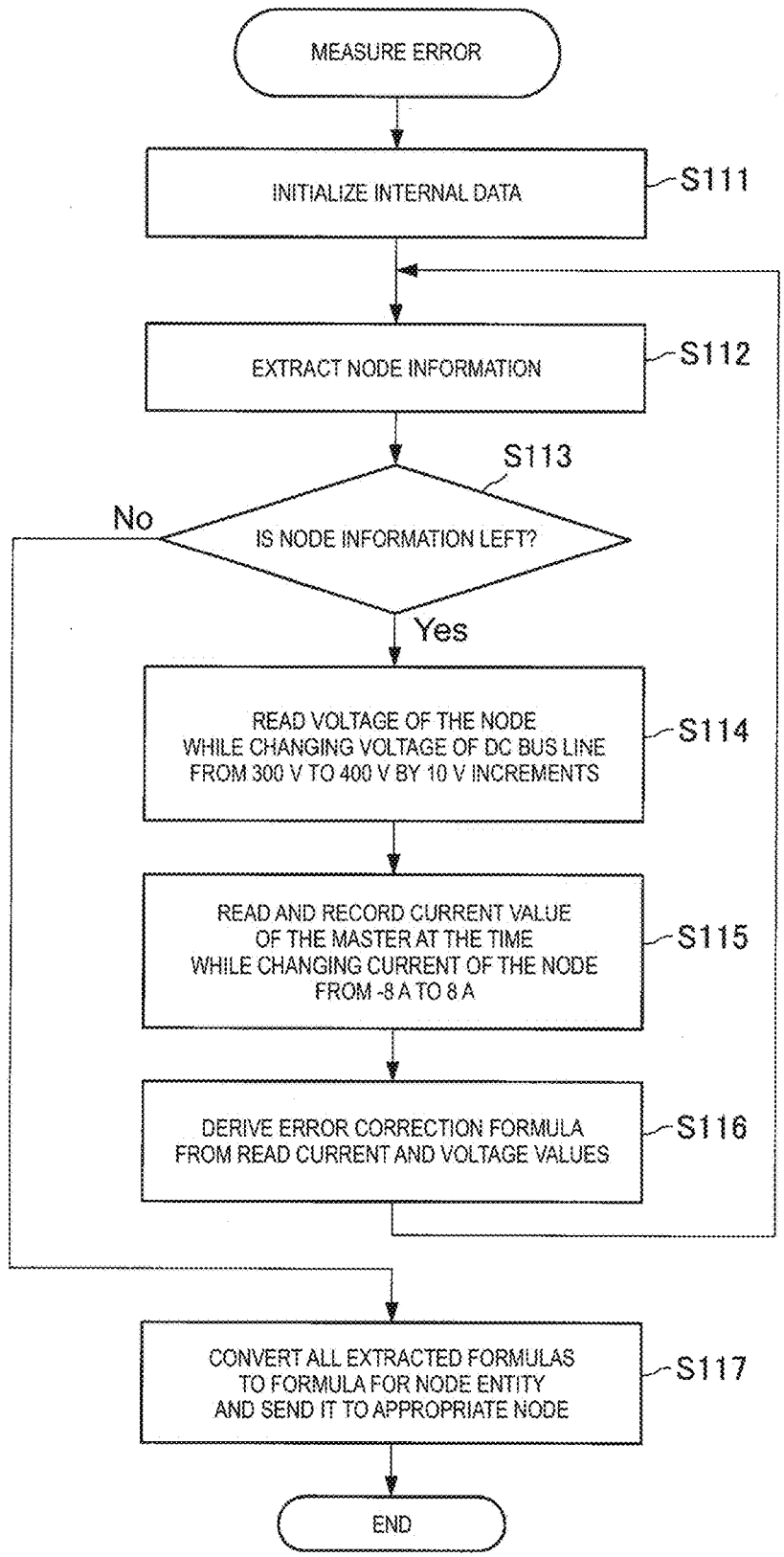
FIG. 5 is an exemplary operation of a battery server according to an embodiment of the present disclosure.

FIG. 5 is an exemplary operation of a battery server according to an embodiment of the present disclosure. FIG. 5 illustrates an exemplary operation of the battery server according to an embodiment of the present disclosure concerning details of the measurement of the reading error between the battery servers shown in step S104 of FIG. 4.

In measuring the reading error between the battery servers, the GM-Agent initializes internal data, that is, initializes the error correction formula (step S111).

Subsequently, the GM-Agent extracts one node from the registered node information (step S112). In extracting one node from the registered node information, the GM-Agent determines whether there is remaining node information (step S113). If node information still remains (Yes in step S113), the GM-Agent acquires a voltage value of the target node while changing the voltage of the DC bus line 20 within a certain range by controlling a DC-DC converter operating in the constant voltage control mode (Step S114). In the example illustrated in FIG. 6, the GM-Agent changes the voltage of the DC bus line 20 from 300 V to 400 V by 10 V increments and acquires the voltage value of the target node.

The GM-Agent, when acquiring the voltage value of the target node, acquires a current value of the DC-DC converter of the battery server having the control right while changing the current of the target node within a certain range (Step S115). In the example illustrated in FIG. 6, the GM-Agent acquires the current value of the DC-DC converter of the battery server having the control right while changing the current of the target node between −8 A and 8 A.

Subsequently, the GM-Agent calculates an error correction formula using the voltage value acquired in step S114 and the current value acquired in step S115 (step S116). The calculation of the error correction formula in step S116 will be described in detail later.

On the other hand, if it is determined in step S113 that there is no node information left (No in step S113), then the GM-Agent changes the calculated formula to a formula for each node entity and transmits it to each node (Step S117).

The detailed procedure of the measurement of the reading error between the battery servers has been described with reference to FIG. 5. Next, the calculation of the error correction formula shown in step S116 of FIG. 5 is described in detail.

Figure 6:
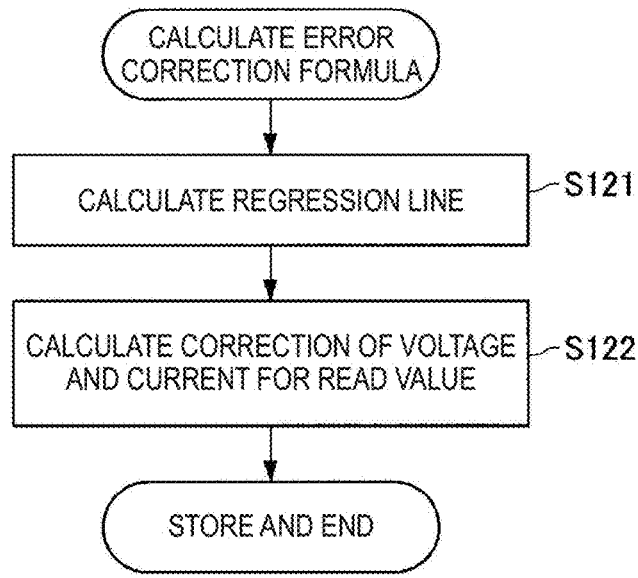
FIG. 6 is an exemplary operation of a battery server according to an embodiment of the present disclosure.

FIG. 6 is an exemplary operation of the battery server according to an embodiment of the present disclosure. FIG. 6 illustrates an exemplary operation of the battery server according to an embodiment of the present disclosure concerning details of the calculation of the error correction formula shown in step S116 of FIG. 5.

The GM-Agent calculates a regression line using the voltage value acquired in step S114 of FIG. 5 and the current value acquired in step S115 (step S121). The present embodiment calculates a regression line by the method of least squares.

Figure 7:
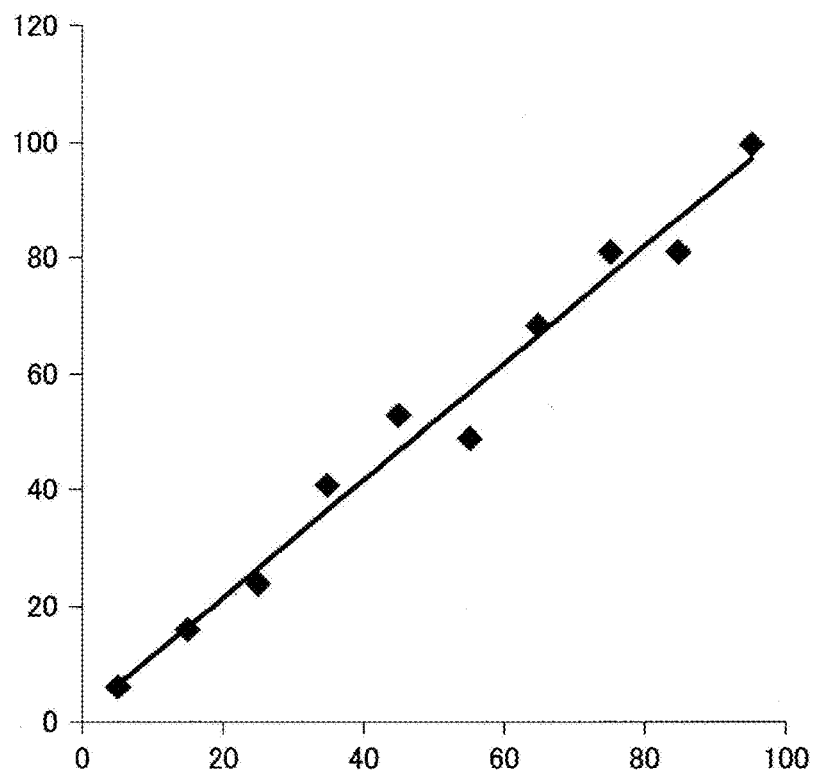
FIG. 7 is a diagram illustrated to describe an example of calculation of a regression line.

FIG. 7 is a diagram illustrated to describe an example of calculation of a regression line. In the case where values are obtained as shown in FIG. 7, the GM-Agent calculates the regression line y=ax+b by the method of least squares. Moreover, slope a and intercept b in the regression line y=ax+b are obtained by the following mathematical formula.

[Math. 1]
$$a = \frac{n\sum_{i=1}^{n} x_i y_i - \sum_{i=1}^{N} x_i \sum_{i=1}^{n} y_i}{n\sum_{i=1}^{n} x_i^2 - \left(\sum_{i=1}^{n} x_i\right)^2}$$

$$b = \frac{\sum_{i=1}^{n} x_i^2 \sum_{i=1}^{n} y_i - \sum_{i=1}^{n} x_i y_i \sum_{i=1}^{n} x_i}{n\sum_{i=1}^{n} x_i^2 - \left(\sum_{i=1}^{n} x_i\right)^2}$$

The GM-Agent, when calculating the regression line in step S121, calculates a correction value for the voltage value acquired in step S114 and the current value acquired in step S115 on the basis of the calculated regression line (step S122). In other words, GM-Agent calculates a correction value for each of voltage and current.

In the present embodiment, the GM-Agent calculates an average of the slope a and the intercept b of the regression line y=ax+b obtained for all the battery servers. Then GM-Agent subtracts the average of the slope a and the intercept b from the slope a and intercept b of the formula of the regression line for each battery server, and transmits the formula obtained by the subtraction to the corresponding battery server. Each battery server corrects the value using the formula transmitted from the battery server in which the GM-Agent is activated in transmitting and receiving the DC power through the DC bus line 20.

The inversion of the error correction formula in step S106 of FIG. 4 means to invert the difference from the average value of the slope a and the intercept b using the average value of slope a and the intercept b as the axis.

Figure 8:
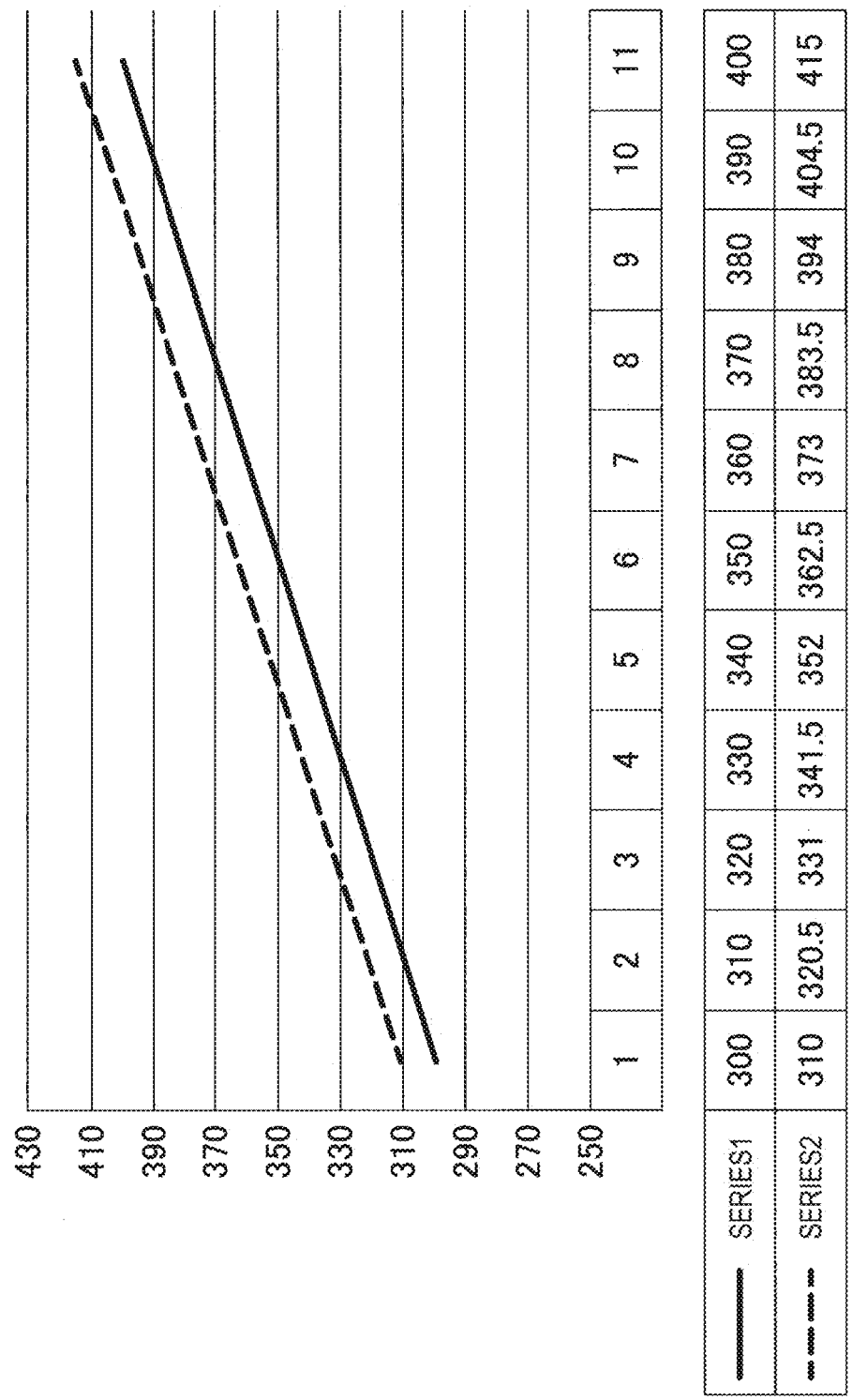
FIG. 8 is a diagram illustrated as a graph to describe an example of an error in a reading value of voltage in a battery server.
Figure 9:
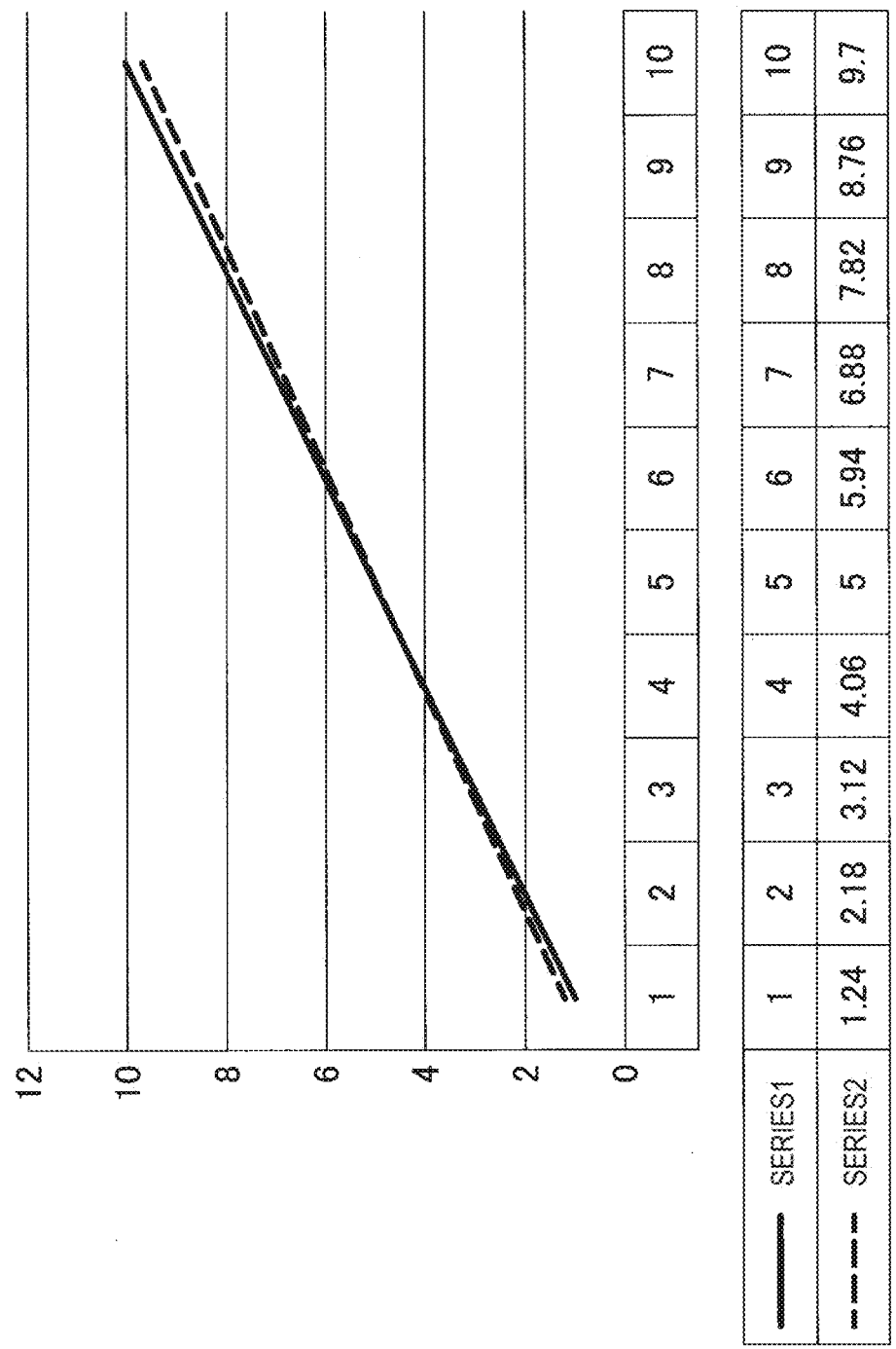
FIG. 9 is a diagram illustrated as a graph to describe an example of an error in a reading value of current in a battery server.

FIG. 8 is a diagram illustrated as a graph to describe an example of an error in a reading value of voltage in a battery server. FIG. 9 is a diagram illustrated as a graph to describe an example of an error of a reading value of current in a battery server.

In one example, the graph of FIG. 8 shows a state in which, as the GM-Agent changes the voltage of the DC bus line 20 from 300 V to 400 V (series 1), the voltage values deviate in a battery server (series 2). In addition, the graph of FIG. 9 shows a state in which, as the GM-Agent changes the setting of the current value from 1 A to 10 A for a battery server (series 1), actual current values deviate in the battery server (series 2).

The GM-Agent calculates an error in the actual voltage and current values, calculates an average value, and transmits information on the error to each battery server. Thus, it is possible to achieve the balanced power transmission and reception in transmitting and receiving DC power among the battery servers. Thus, the GM-Agent can function as an instructing unit and a correction reference value deciding unit of the present disclosure.

2. SUMMARY

An embodiment of the present disclosure as described above provides a battery server capable of performing balanced power transmission and reception among a plurality of battery servers by correcting an error in the power transmission and reception control system including the plurality of battery servers that transmit and receive DC power via the DC bus line 20 in transmitting and receiving DC power among the battery servers connected to the DC bus line 20.

In the present embodiment, a technique for correcting the error in the values read by the DC-DC converter has two types of techniques. One is an on-demand error correction technique in which correction is performed as necessary in performing power transmission and reception and the other is an in-advance error correction technique in which correction is performed in advance using a value read by the DC-DC converter, of which one can be selected by the user.

The on-demand error correction technique is an approach, in transmitting and receiving DC power between battery servers connected to the DC bus line 20, of deciding in advance which of the power transmission and reception sides is set to a correct value and of transmitting and receiving DC power using the voltage and current values on the side determined as the correct value.

The in-advance error correction technique is an approach in which a reference value is obtained prior to the transmission and reception of the DC power between the battery servers connected to the DC bus line 20 and an error with respect to the reference value is held in each of the each battery servers. In the present embodiment, two techniques of a simple error correction technique and the in-advance error correction technique are provided. The simple error correction technique is an approach of controlling transmission and reception of DC power on the basis of information on a difference between read values of two battery servers. In the in-advance error correction technique, an error in each battery server is obtained using, for example, the method of least squares, and a reference value is determined by averaging the errors.

The battery server according to an embodiment of the present disclosure corrects the error in the reading values of the voltage value or the current value in transmitting and receiving DC power between the battery servers as described above, and thus it is possible to perform balanced transmission and reception of DC power between the battery servers. Furthermore, the battery server according to an embodiment of the present disclosure corrects the error in the reading values of the voltage value or the current value in transmitting and receiving DC power between the battery servers. Thus, the inflow and outflow of unnecessary current in and from the battery server maintaining the voltage of the DC bus line at the predetermined voltage are eliminated and the operation of the power transmission and reception control system is stabilized.

Steps in processes executed by devices in this specification are not necessarily executed chronologically in the order described in a sequence chart or a flow chart. For example, steps in processes executed by devices may be executed in an order that differs from that described in a flow chart or may be executed in parallel.

Further, a computer program can be created which causes hardware such as a CPU, ROM, or RAM, incorporated in each of the devices, to function in a manner similar to that of structures in the above-described devices. Furthermore, it is possible to provide a recording medium having the computer program recorded thereon. Moreover, the hardware configuration of each function block shown in functional block diagrams allows a series of processes to be implemented in hardware.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art on the basis of the description of this specification.

Additionally, the present technology may also be configured as below.

(1)

A DC power control device including:

an instructing unit configured to instruct another device connected to a DC bus line to read a voltage value and a current value on the DC bus line; and a correction reference value deciding unit configured to acquire the voltage value and the current value read by the other device and to decide a correction reference value in transmitting and receiving DC power to and from the other device through the DC bus line using the acquired values.

(2)

The DC power control device according to (1), wherein the correction reference value deciding unit decides, as the correction reference value, an average of differences between the voltage value and the current value in performing the instruction by the instructing unit and the voltage value and the current value read by the other device.

(3)

The DC power control device according to (2), wherein the correction reference value deciding unit converts the correction reference value to a value based on the other device and transmits the converted correction reference value to the other device.

(4)

The DC power control device according to any of (1) to (3), wherein the correction reference value deciding unit decides, as the correction reference value, a current value and a voltage value of a device serving as a power receiving destination in transmitting and receiving DC power on the DC bus line.

(5)

The DC power control device according to any of (1) to (4), wherein the correction reference value deciding unit decides, as the correction reference value, a current value and a voltage value of a device serving as a power transmission source in transmitting and receiving DC power on the DC bus line.

(6) The DC power control device according to any of (1) to (5),
wherein the correction reference value deciding unit decides the correction reference value for each of voltage and current.

(7) A method of controlling DC power, the method including:
instructing another device connected to a DC bus line to read a voltage value and a current value on the DC bus line; and
acquiring the voltage value and the current value read by the other device and deciding a correction reference value in transmitting and receiving DC power to and from the other device through the DC bus line using the acquired values.

(8) A DC power control system including:
a plurality of battery servers connected to a DC bus line, wherein each of the battery servers includes
an instructing unit configured to instruct another battery server connected to the DC bus line to read a voltage value and a current value on the DC bus line, and
a correction reference value deciding unit configured to acquire the voltage value and the current value read by the other battery server and to decide a correction reference value in transmitting and receiving DC power between the battery servers through the DC bus line using the acquired values.

REFERENCE SIGNS LIST 1 power transmission and reception control system
10a-d customer
20 DC bus line
21a-d local bus line
30, 30a, 30b communication line
100a-d battery server
150a-d DC-DC converter
160a-d battery
170a-d scenario
180 policy
200a-d solar panel

The invention claimed is:

1. A DC power control device of a first battery server, comprising:
a processing device and a memory device containing instructions that, when executed by the processing device, implement:
an instructing unit configured to instruct a second battery server connected to a DC bus line to read voltage values of the second battery server while changing a voltage of the DC bus line and configured to read current values of the first battery server while changing a current of the second battery server;
a correction reference value deciding unit configured to acquire the voltage values and the current values and to decide a correction reference value based on the acquired values in transmitting and receiving DC power to and from the second battery server through the DC bus line using the acquired values; and
a control unit configured to control transmitting and receiving DC power, on the DC bus line, to and from the second battery server using the acquired values and the correction reference value.

2. The DC power control device according to claim 1, wherein the correction reference value deciding unit decides, as the correction reference value, an average of differences between voltage values and current values.

3. The DC power control device according to claim 2, wherein the correction reference value deciding unit converts the correction reference value to a value based on the second battery server and transmits the converted correction reference value to the second battery server.

4. The DC power control device according to claim 1, wherein the correction reference value deciding unit decides, as the correction reference value, a current value and a voltage value of a battery server serving as a power receiving destination in transmitting and receiving DC power on the DC bus line.

5. The DC power control device according to claim 1, wherein the correction reference value deciding unit decides, as the correction reference value, a current value and a voltage value of a battery server serving as a power transmission source in transmitting and receiving DC power on the DC bus line.

6. The DC power control device according to claim 1, wherein the correction reference value deciding unit decides the correction reference value for each of voltage and current.

7. A method of controlling DC power by a first battery server using a
processing device and a memory device containing instructions that, when executed by the
processing device, perform the method comprising:
instructing a second battery server connected to a DC bus line to read voltage values of the second battery server while changing a voltage of the DC bus line and reading current values of the first battery server while changing a current of the second battery server;
acquiring the voltage values and the current values and deciding a correction reference value based on the acquired values in transmitting and receiving DC power to and from the second battery server through the DC bus line using the acquired values; and
controlling transmitting and receiving DC power, on the DC bus line, to and from the second battery server using the acquired values and the correction reference value.

8. A DC power control system comprising:
a plurality of battery servers connected to a DC bus line, wherein a first battery server of the battery servers includes
a processing device and a memory device containing instructions that, when executed by the processing device, implement:
an instructing unit configured to instruct a second battery server of the battery servers connected to the DC bus line to read voltage values of the second battery server while changing a voltage of the DC bus line and configured to read current values of the first battery server while changing a current of the second battery server;
a correction reference value deciding unit configured to acquire the voltage values and the current values and to decide a correction reference value based on the acquired values in transmitting and receiving DC power between the battery servers through the DC bus line using the acquired values; and
a control unit configured to control transmitting and receiving DC power, on the DC bus line, to and from the second battery server using the acquired values and the correction reference value.

* * * * *